United States Patent
Ramaswamy et al.

(12) 
(10) Patent No.: US 7,660,595 B2
(45) Date of Patent: *Feb. 9, 2010

(54) METHOD AND APPARATUS FOR UPDATING MOBILE IP DATA CONNECTIVITY ON TRANSITIONS BETWEEN WIRELESS NETWORKS

(75) Inventors: Venkateshwaran Ramaswamy, San Diego, CA (US); Jeffrey Alan Dyck, San Diego, CA (US); Kavitha Vallari Devara, La Jolla, CA (US); Sriram Nagesh Nookala, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 398 days.

This patent is subject to a terminal disclaimer.

(21) Appl. No.: 11/182,086

(22) Filed: Jul. 14, 2005

(65) Prior Publication Data

US 2006/0023668 A1   Feb. 2, 2006

Related U.S. Application Data

(60) Provisional application No. 60/588,514, filed on Jul. 15, 2004.

(51) Int. Cl.
*H04B 7/19* (2006.01)
*H04L 12/56* (2006.01)
(52) U.S. Cl. .................. 455/502; 455/13.2; 370/395.62
(58) Field of Classification Search .................. None
See application file for complete search history.

(56) References Cited

U.S. PATENT DOCUMENTS 5,991,626 A * 11/1999 Hinz et al. .................. 455/436
7,327,706 B2   2/2008 Joshi et al.
2005/0281227 A1* 12/2005 Vedder et al. ............... 370/331

* cited by examiner

*Primary Examiner*—Nick Corsaro
*Assistant Examiner*—Joel Ajayi
(74) *Attorney, Agent, or Firm*—Kyong Macek; Kristine U. Ekwueme

(57) ABSTRACT

Methods and apparatus are presented to facilitate the transfer of a PPP session of a mobile communication device that is handed between multiple communication networks with different air interfaces.

15 Claims, 6 Drawing Sheets

SIMPLE 1x + 1xEVDO NETWORK  FIG. 1

METHOD AND APPARATUS FOR UPDATING MOBILE IP DATA CONNECTIVITY ON TRANSITIONS BETWEEN WIRELESS NETWORKS

RELATED APPLICATIONS

This application claims priority to U.S. Provisional Application No. 60/588,514, filed on Jul. 15, 2004.

BACKGROUND

1. Field

The present invention relates generally to communications, and more specifically, to the transmission of packetized data over wireless communication systems.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies, or any other frequencies upon which wireless telephony networks may operate. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. The IS-95 standard subsequently evolved into "3G" systems, such as cdma2000 and WCDMA, which provide more capacity and high speed packet data services. Two variations of cdma2000 are presented by the documents IS-2000 (cdma2000 1xRTT) and IS-856 (cdma2000 1xEV-DO), which are issued by TIA. The cdma2000 1xRTT communication system offers a peak data rate of 153 kbps. The cdma2000 1xEV-DO communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems. The WCDMA standard is embodied in 3rd Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. One such protocol is "The Internet Protocol," Request for Comment (RFC) 791 (September, 1981). The Internet Protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. Another protocol is the Point-to-Point Protocol (PPP), promulgated in RFC 1661 and RFC 1662 (both published in July 1994), which is an encapsulation protocol for transporting IP traffic over point-to-point links. Yet another protocol is the IP Mobility Support, promulgated in RFC 2002 (October 1996), which is a protocol that provides for transparent routing of IP datagrams to mobile nodes.

Hence, the transmission of data packets from the IP network over a wireless communication network or from the wireless communication network over the IP network can be accomplished by adherence to a set of protocols, referred to as a protocol stack. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer. The RLP layer is the Radio Link Protocol layer, which is responsible for retransmitting packets when a transmission error occurs. The packets are transported over the air to a packet data service node (PDSN) via an Access Point (AP), whereupon the packet is subsequently sent over the IP network. Alternatively, IP packets are transmitted over the IP network to a PDSN, from a PDSN to an AP, and then over-the-air to a wireless communication device. The wireless communication device is also referred to as an Access Terminal (AT) herein.

Various connectivity problems arise due to the mobility of wireless communication devices. Some of these problems arise when a mobile wireless communication device moves from the support of one communication system to the support of another communication system. For example, it is currently envisioned that a mobile wireless communication device may be designed to move from the support of a cdma2000 1xRTT system to a cdma2000 1xEV-DO system or vice versa. The cdma2000 1xRTT system and cdma2000 1xEV-DO system are also referred to herein as 1xRTT and 1xEV-DO, respectively. The interoperability of a device between 1xRTT networks is the subject of a standard known as TIA/EIA/IS-2001, which is entitled, "Interoperability Specifications (IOS) For cdma2000 Access Network Interfaces." The interoperability of a device between 1xEV-DO networks is currently the subject of a standard known as TIA/EIA/IS-878, which is entitled, "Inter-Operability Specification (IOS) for High Rate Packet Data (HRPD) Network Access Interfaces." However, there is no authoritative document describing the interoperability between 1xRTT and 1xEV-DO networks for devices that may support both air interface standards, as this vision of ubiquitous mobility within CDMA standards is relatively recent. When the IS-2000 and IS-856 standards were originally created, full interoperability was not envisioned between such standards, and certain features were deemed optional, rather than required. Hence, various manufacturers and system operators are currently in the predicament of being unable to support seamless transfer of a communication device's PPP session across different CDMA standards, such transfer being confounded by a pre-existing PPP state for the device on the destination network. There is a present need to address this concern.

SUMMARY

Methods and apparatus are presented to address the needs presented above. In one aspect, a method is presented for resynchronizing a Point-to-Point Protocol (PPP) session that has been initiated between a first network and an access terminal (AT), continued between a second network and the AT, and subsequently continued between the first network and the AT, the method comprising: recognizing that this "handback" situation has arisen, determining whether the first network may be unaware of the handback situation, and forcing a resynchronization of the PPP session if the first network is determined to be out of sync with the AT's PPP state.

In another aspect, a method is presented for resynchronizing a Point-to-Point Protocol (PPP) session that has been initiated between a first network and an access terminal (AT), continued between a second network and the AT, and subsequently continued between the first network and the AT, the method comprising: mapping an identifier of a first packet control function to a first foreign agent; mapping an identifier of a second packet control function to a second foreign agent; and if the two identifiers are the same, then forcing a PPP resychronization.

In another aspect, a method is presented for resynchronizing a Point-to-Point Protocol (PPP) session that has been initiated between a first network and an access terminal (AT), continued between a second network and the AT, and subsequently continued between the first network and the AT, the method comprising: storing a PPP Magic Number associated with a PDSN of the first network; transmitting an Echo-Request Link Control Protocol (LCP) packet if the AT is in a new coverage area; receiving an Echo-Reply LCP packet; comparing a PPP Magic Number in the Echo-Reply LCP packet to the stored PPP Magic Number; and if a zombie PPP states exists on the new coverage area and if the stored PPP Magic Number and the PPP Magic Number in the Echo-Reply LCP packet do not match, then initializing a PPP resynchronization.

DETAILED DESCRIPTION

Because the embodiments are directed towards mobile IP telephony, the terminology of RFC 2002 will also be used forthwith. The protocol promulgated in RFC 2002 enables a mobile, wireless communication device to change the point of attachment to the Internet without having to change the IP address of the device. Namely, RFC 2002 describes a registration scheme that informs a home agent of the location of a wireless communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "mobile node". The functions of a foreign agent can be accomplished by a base station controller (BSC) or packet data service node (PDSN) in a visited network. The functions of a home agent can be accomplished by a BSC or PDSN in the home network. Authentication, authorization, and accounting functions are usually performed by a server, which is referred to as an Authentication, Authorization, and Accounting (AAA) Server. The AAA server is communicatively coupled to the PDSN and the home agent.

Figure 1:
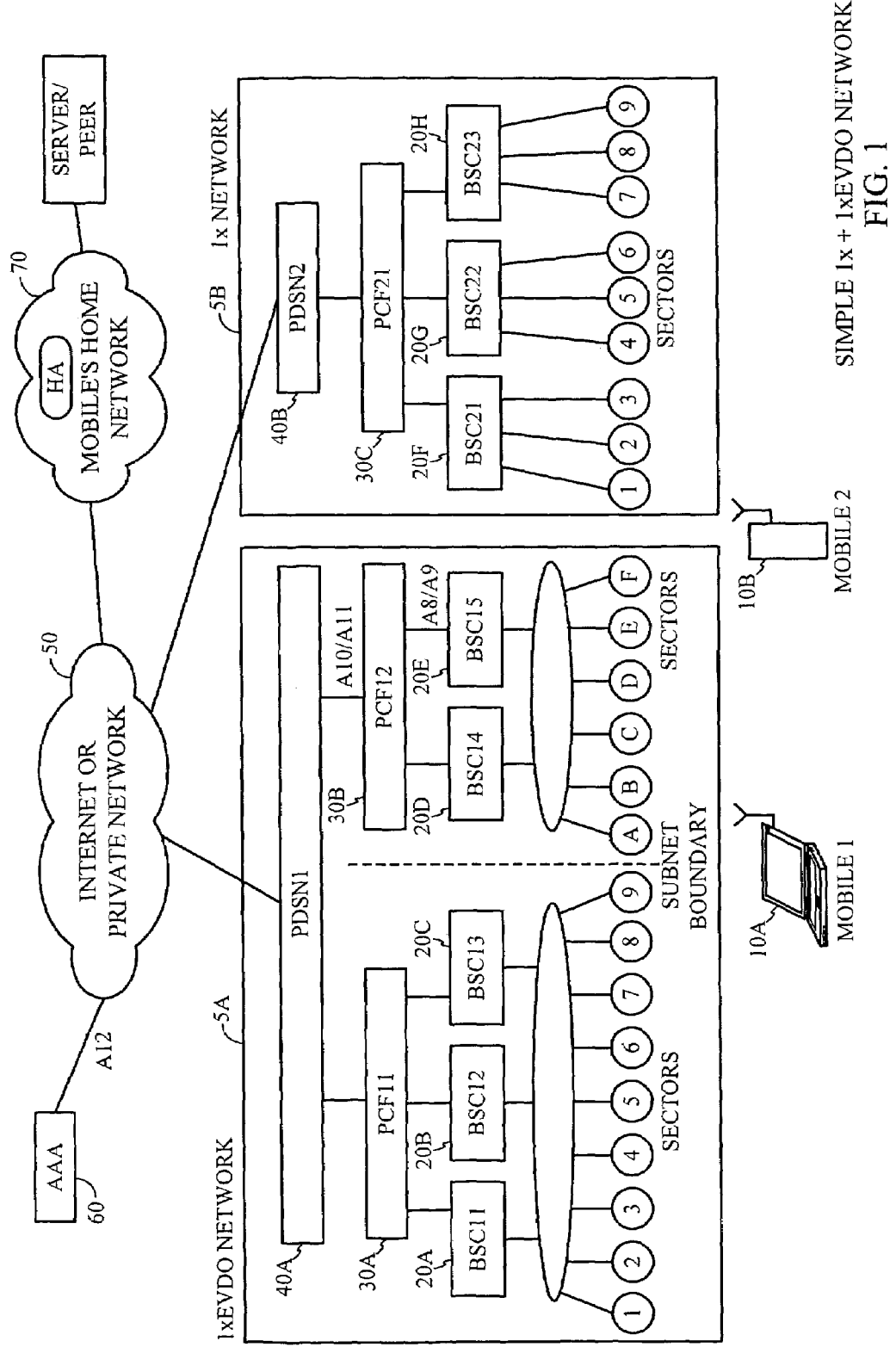
FIG. 1 is a block diagram of conceptual entities in IS-2000 and IS-856 data networks.

FIG. 1 illustrates the connections between a plurality of wireless communication devices and various infrastructure elements of two cdma2000 systems. A plurality of access terminals $10a$-$b$ (also called remote stations, mobile stations, subscriber units, or user equipment) operate within sectors of a plurality of base station controllers $20a$-$c$, $20d$-$e$, $20f$-$h$ (also called radio network controller) of different networks $5a$, $5b$. The base station controllers $20a$-$c$, $20d$-$e$, $20f$-$h$ are supported by packet control functions (PCF) $30a$, $30b$, $30c$, respectively. Some packet control functions $30a$, $30b$ are supported by a PDSN $40a$ of one network $5a$ while the other packet control function $30c$ is supported by a PDSN $40b$ of the other network $5b$. It should be understood by one of skill in the art that there could be any number of access terminals 10, base station controllers 20, packet control functions 30 and PDSNs 40. The PDSNs 40 are coupled to a public or private IP network 50, which is coupled to an AAA server 60 and/or a Home Agent 70 of the access terminals 10.

The access terminals 10 may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, access terminals may be any type of communication unit.

In cdma2000 1xEV-DO, the wireless communication system entities are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

A "handoff" occurs when a wireless communication device moves from the support of one base station to the support of another base station. Handoffs may be "soft," wherein the device is in communication with both base stations at the same time during the handoff process, or "hard," wherein the device ends communications with one base station before beginning communications with another base station. A handoff between one CDMA air interface system and another air interface system is referred to as a "dormant" handoff when a PPP session exists between the AT and the PDSN, but there is no traffic channel/connection active. In other words, the AT and the PDSN maintain the PPP state but do not transfer data nor establish a traffic channel over the air interface. When the AT is actively transferring data between itself and a PDSN, then the session is referred to as an "active data session."

Figure 2:
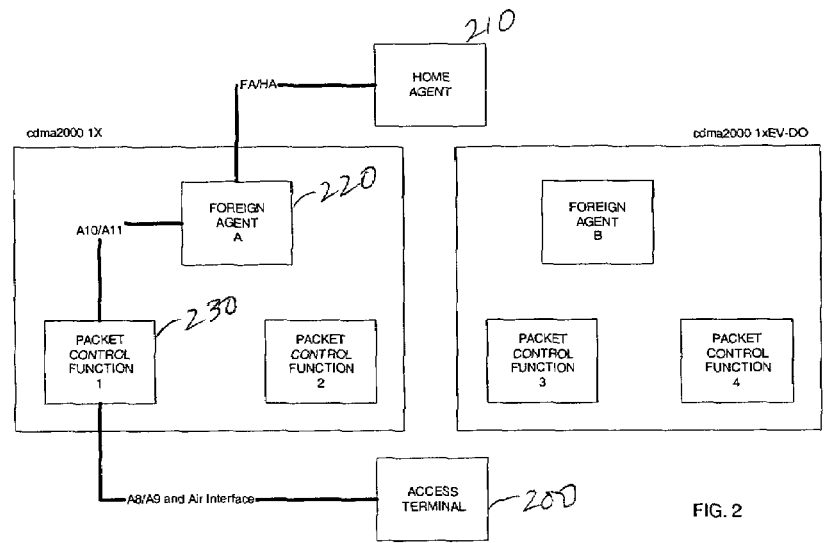
FIG. 2 is a simplified diagram illustrating the concepts of RFC 2002 laid over the entities of FIG. 1.

FIG. 2 is a simplified diagram illustrating the concepts of RFC 2002 laid over the entities of FIG. 1. In FIG. 2, the AT 200 has a Mobile IP registration with the HA 210 and a PPP session open with the FA 220. The connections between the different entities are referred to as bindings. The bindings between a BSC and a Packet Control Function are referred to as A8/A9 bindings. For illustrative ease, the presence of the air interface between the AT 200 and BSC is not shown, but rather, implied in references to the A8/A9 link between BSC and PCF contained hereafter. The bindings between PCF 230 and the FA 220 are known as A10/A11 bindings. The bindings between the FA 220 and the HA 210 are referred to herein as the FAIHA bindings.

Since the 1xRTT network is different from the 1xEV-DO network, different mechanisms are in place to facilitate the transfer of a PPP session from one network to another. An AT may transfer a PPP session from a 1xEV-DO system to a 1xRTT system by sending an origination message with a data service option to the 1xRTT system. The origination message may be sent with the Data Ready To Send (DRS) bit set to "1" if the AT has real data to send to the network. The origination message may be sent with the DRS bit set to "0" if the AT does not have any data to send but simply wants to indicate the transfer of the PPP session to the 1xRTT network.

According to IS-878, an AT that has already established a PPP session in a cdma2000 1xRTT system may transfer the PPP session over to a cdma2000 1xEV-DO system, if the 1xEV-DO system supports the Location Update Protocol. The Location Update Protocol allows an AT to send an unsolicited location notification message (ULNM) to the new network whenever the AT determines that the AT has traveled to another air-interface network or that the AT has crossed a subnet boundary within the air-interface network. Upon receipt of the ULNM, the network determines whether the AT's PPP session is current. If the PPP session is not current, then the network forces a resynchronization of the PPP session on behalf of the AT.

Unfortunately, the Location Update Protocol is not a required feature in the cdma2000 1xEV-DO standard. Hence, there are some infrastructure manufacturers who chose not to support the Location Update Protocol at the time the cdma2000 1xEV-DO standard was being formulated. Therefore, an alternate mechanism is needed to force resynchronization of PPP sessions without affecting infrastructure equipment that have already been designed and manufactured. PPP resynchronization and Mobile IP re-registration are required in order to update the FA/HA bindings. Moreover, PPP resynchronization is required because the PPP session parameters of one network may differ from the PPP session parameters of another network. For example, the PPP framing may differ amidst and between different PPP sessions. "Framing" refers to the formation of transmission units at the Data Link Layer underlying the IP protocol. A frame may include a header and/or a trailer, along with the framed IP datagram or portion thereof.

Co-pending U.S. patent application Ser. No. 10/669,600, entitled, "RESYNCHRONIZATION OF POINT-TO-POINT PROTOCOL SESSIONS FOR INTER-PDSN HANDOFFS," addresses the problem of forcing resynchronization of the PPP sessions when the AT moves from the support of a packet control function in one system to the packet control function of another system when the Location Update Protocol is not available. In the aforementioned co-pending application, the AT stores a RANHandoff attribute/indicator in memory when the AT enters the coverage of a new air-interface network and receives attributes of the new air-interface network. If the AT determines that the RANHandoff indicator is set to indicate that the new network supports the Location Update Protocol, then the AT transmits an ULNM to the network. The network, not the AT, then determines whether to force a PPP session resynchronization.

However, if the AT determines that the RANHandoff indicator is set to indicate that the new network does not support the Location Update Protocol, then the AT itself forces a PPP session resynchronization by transmitting a Link Control Protocol Configuration Request message (LCPConfigRequest) to the new network. The receipt of an LCPConfigRequest will force the resynchronization of the PPP session to occur.

Even with the forced resynchronization procedure described in the aforementioned co-pending patent application, a problem still exists. Namely, when an AT moves a PPP session from the support of a PDSN (Foreign Agent) on an 1xEV-DO network back to the support of a previously visited PDSN that happens to be on a cdma2000 1xRTT (rel. 0) network, there may already be an existing "zombie" PPP instance from the AT's last visit. This situation will be referred to herein as a "handback".

Figure 3:
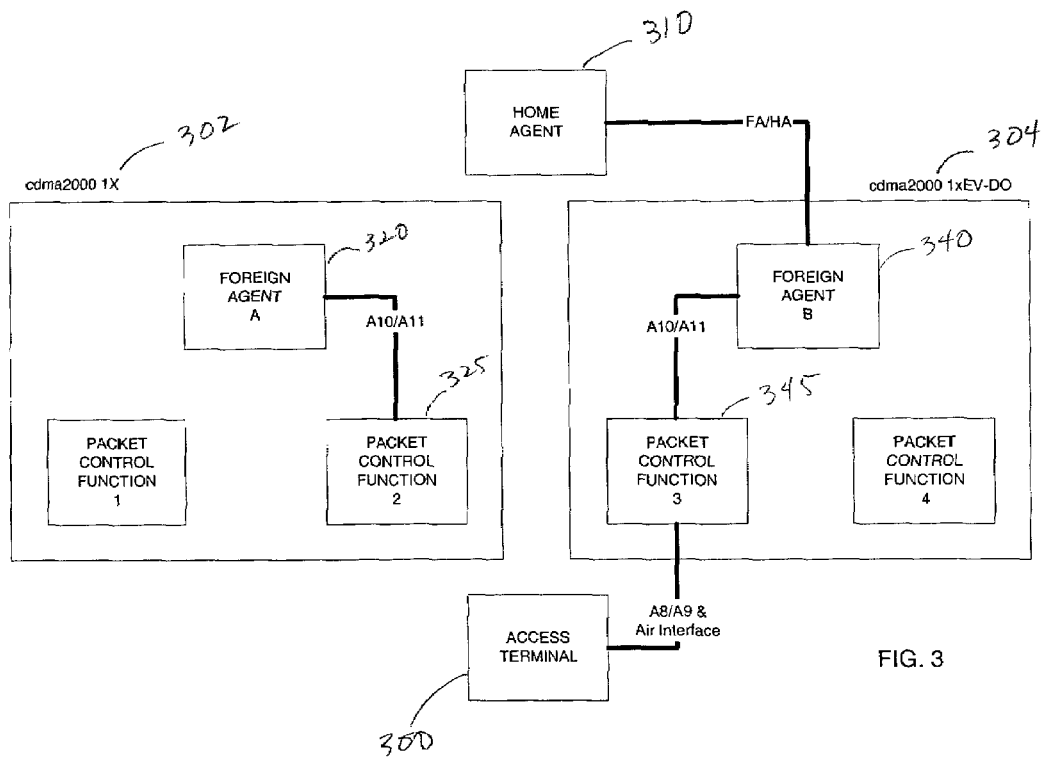
FIG. 3 is a block diagram that illustrates the PPP bindings set up between network entities when the AT transitions from the 1xRTT network to the 1xEV-DO network.

Unfortunately, there are no mechanisms that a 1xRTT (rel. 0) network can use to differentiate between the scenario where an AT has arrived from a different serving PDSN due to handback as opposed to the scenario where dormant reorigination occurs under the same PCF without handback. In particular, when the standards were originally designed, the A10/A11 binding between the Foreign Agent and the PCF was allowed to remain active in the dormant state, even though the A8/A9 binding between the PCF and the AT and the FA/HA bindings were torn down. FIG. 3 illustrates this situation.

When the AT 300 moves from the 1xRTT system 302 to the 1xEV-DO system 304, a new PPP session is established in the new network between the AT 300 and the Home Agent 310. However, the A10/A11 binding in the old network is still active between the Foreign Agent 320 and the PCF 325. Note that allowing the old A10/A11 binding to remain active probably made sense when the standards did not envision interoperability between air interfaces. Accordingly, a PPP resynchronization and a Mobile IP re-registration need to be performed in order to update the bindings between the Foreign Agent B 340 of the 1xEV-DO system 304 and the Home Agent 310, and to maintain the integrity of the PPP framing. This update is required in order for the new network to correctly route IP packets to the AT 300.

Another problem that arises with handbacks is the ambiguity created by existence of a Previous Access Network ID (PANID) parameter that exists in the cdma2000 1xRTT network, but not in the cdma2000 1xEV-DO network. The 1xRTT standard requires that all PCFs have a unique PANID. The 1xEV-DO standard does not. The ambiguity arises when an AT transitions from a 1xEV-DO network to a 1xRTT network. The Current Access Network ID (CANID) of the 1xEV-DO network may be the same value as the PANID of the 1xRTT network.

If the CANID value is the same as the PANID value, then the 1xRTT network will not resynchronize the PPP session since the 1xRTT network believes that the AT had merely been dormant. If the AT had merely been dormant, then the old PPP parameters and Mobile IP bindings would suffice to set up the PPP session. In other words, if the 1xEV-DO CANID has a PCF identifier that is the same as the PCF identifier in the 1xRTT PANID, then, when the AT handbacks to the 1xRTT network, there will be no change in the PANID. The 1xRTT network uses a change in the PANID value as a trigger for network-based PPP resynchronization procedures. Hence, if there is no PANID change detected, then there is no network-initiated resynchronization.

Figure 4:
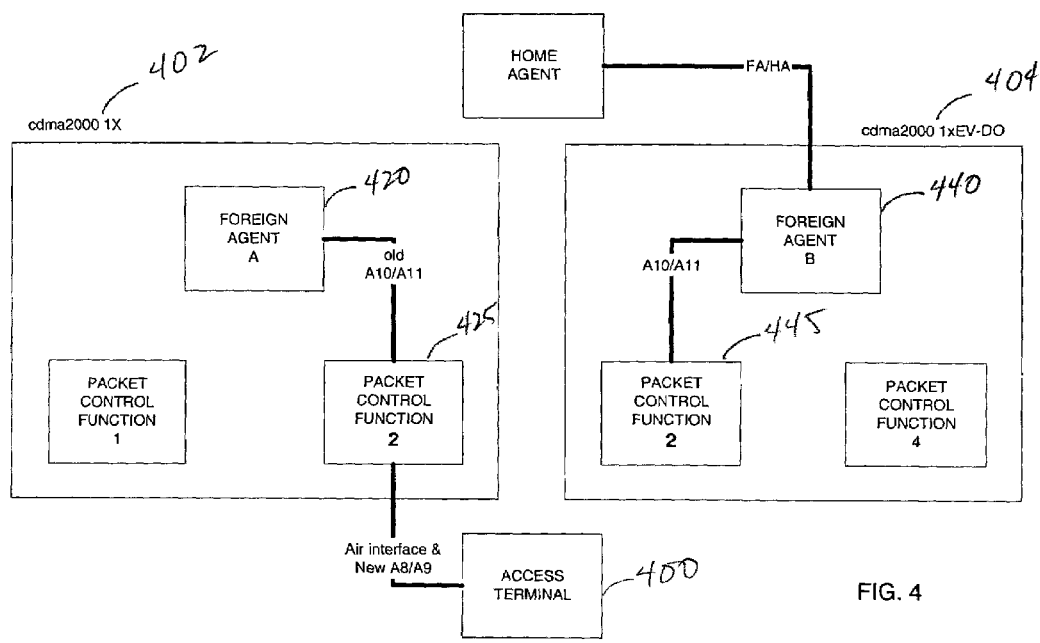
FIG. 4 is a block diagram that illustrates PPP bindings set up between network entities when the AT transitions from the 1xRTT network to the 1xEV-DO network and then back to the 1xRTT network.

The combination of the zombie PPP instance in the 1xRTT system and the lack of a PANID parameter in 1xEV-DO creates a problem when a handback occurs between the 1xRTT network and the 1xEV-DO network. FIG. 4 is a block diagram that illustrates this problem that occurs when the AT transitions from the 1xRTT network to the 1xEV-DO network and then back to the 1xRTT network.

When the AT 400 first moves from 1xRTT 402 to 1xEV-DO 404, all the bindings are torn down except for the A10/A11 binding between FAA 420 and $PCF_2$ 425. At the 1xEV-DO network 404, the AT 400 sets up a PPP session and Mobile IP bindings through FAB 440 via $PCF_2$ 445.

When the AT 400 moves back to the 1xRTT network 402, the AT 400 sends an origination message to $PCF_2$ 425. The Access Network ID (ANID) comprises the Packet Zone ID (PZID), System ID (SID), and the Network ID (NID). Since the packet zone ID is the same in this example, i.e., $PCF_2$ in each network, the 1xRTT network 402 believes that the AT 400 had been merely dormant, rather than believing that the AT 402 had visited another network. If the 1xRTT network 402 is a release 0 network, there is no way for the AT 400 to send the ANID of the 1xEV-DO network 404 in the origination message. The 1xRTT (rel. 0) origination message does not include such a field. Hence, the 1xRTT (rel. 0) network 402 refrains from performing a PPP resynchronization, and no update occurs for the A10/A11 binding nor the FA/HA binding in the 1xRTT (rel. 0) network 402. The resultant bindings after the handback are shown in FIG. 4.

Figure 5:
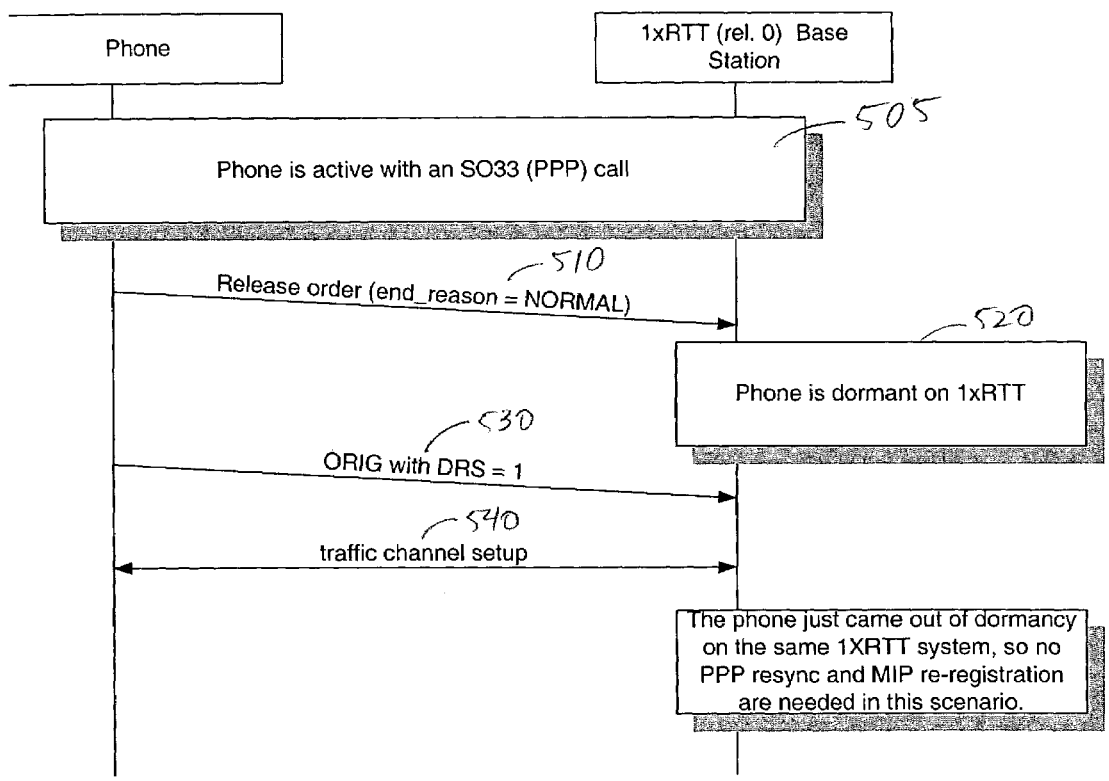
FIG. 5 is a call flow that occurs when an AT enters into dormancy and emerges from dormancy while within one coverage area.
Figure 6:
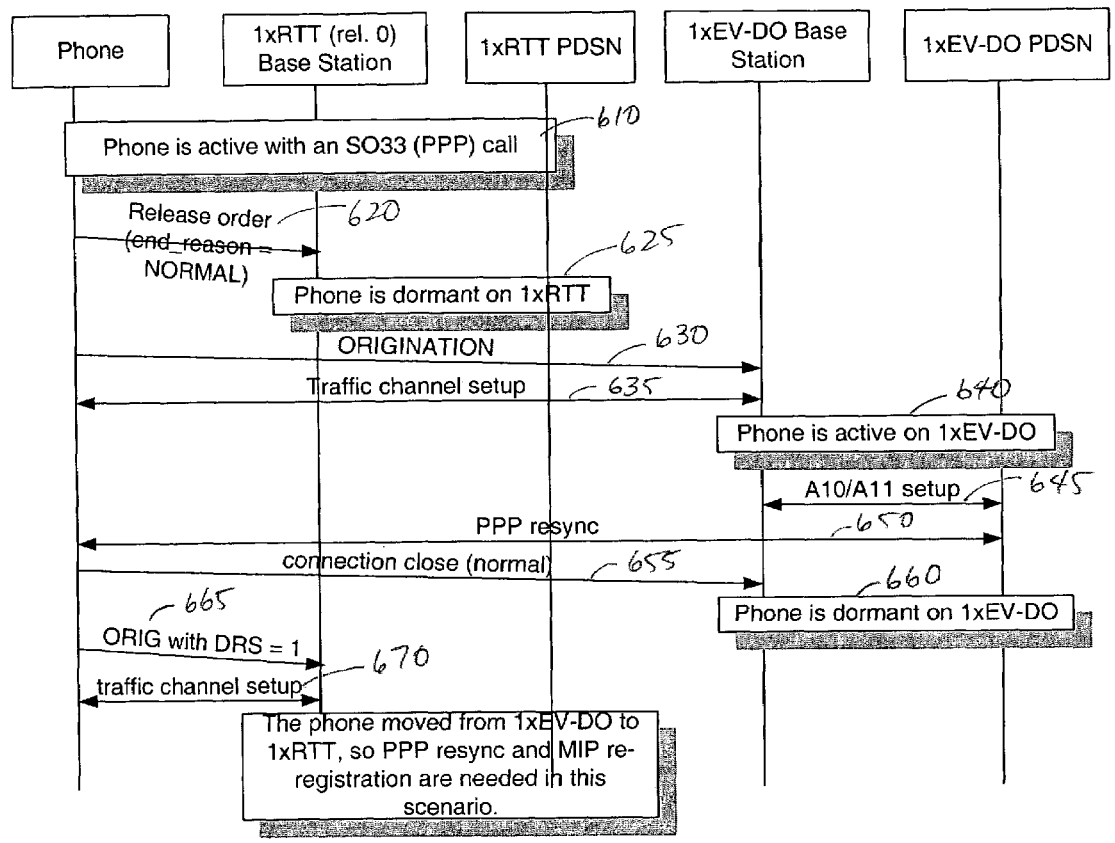
FIG. 6 is a call flow that occurs when an AT enters into dormancy and emerges from dormancy while transitioning between two coverage areas.

FIG. 5 and FIG. 6 describe the call flow scenarios that are indistinguishable by the network, and which illustrate the need for a solution. In FIG. 5, the AT simply goes dormant on a 1xRTT base station and then emerges from dormancy.

At step 505, AT is active with a PPP call. At step 510, the AT sends a release order to 1xRTT (rel. 0) base station to release the PPP call. At step 520, the AT is then dormant on the 1xRTT (rel. 0) base station. When the AT is ready to emerge from dormancy, an origination message with a Data Ready to Send (DRS) bit is sent to the base station at step 530. At step 540, the AT and the base station set up a new traffic channel. In this particular scenario, neither PPP resynchronization nor Mobile IP re-registration is needed since the AT is merely coming out of dormancy.

However, in FIG. 6, the AT first goes dormant on the 1xRTT (rel. 0) base station, hands over to a 1xEV-DO base station (which is supported by a different PDSN), and then hands back over to the 1xRTT system. At step 610, the AT is in an active PPP call. At step 620, the AT sends a release order to the 1xRTT (rel. 0) base station to release the PPP call. At step 625, the AT is dormant on the 1xRTT (rel. 0) base station. During the dormant state, the AT enters the coverage area of a 1xEV-DO base station.

At step 630, the AT emerges from the dormant state by sending an origination message. At step 635, the AT and the 1xEV-DO base station set up a new traffic channel. At step 640, the AT is in an active state on the 1xEV-DO network. At step 645, the A10/A11 binding is setup between the 1xEV-DO base station and the 1xEV-DO PDSN. At step 650, a PPP resynchronization is performed between the AT and the 1xEV-DO PDSN and the AT is active with a PPP call. At step 655, the AT closes the connection. At step 660, the AT becomes dormant. During dormancy, the AT moves back to the coverage area of the 1xRTT (rel. 0) base station. At step 665, when the AT is ready to emerge from dormancy, an origination message with an active Data Ready to Send (DRS) bit is sent to the 1xRTT (rel. 0) base station. At step 670, the AT and the 1xRTT (rel. 0) base station set up a new traffic channel. However, since the A10/11 binding at step 645 is still valid between the 1xEV-DO base station and the 1xEV-DO PDSN, the 1xRTT PDSN will reconnect the zombie session without updating the HA/PDSN binding. This results in a loss of data connectivity, as IP packets received by the HA will not be correctly routed to the 1xRTT PDSN but rather to the 1xEV-DO PDSN, so the AT on the 1xRTT network will not receive the data.

In an ideal world, the 1xRTT (rel. 0) base station would be able to detect whether the call flow of FIG. 5 or the call flow of FIG. 6 actually occurred and then resynchronize the PPP bindings if needed. However, the 1xRTT (rel. 0) base stations that are currently deployed widely have no mechanism for detecting whether the FIG. 5 call flow or the FIG. 6 call flow has occurred. The embodiments that are described herein are for solving this problem by configuring the AT to force PPP resynchronization and Mobile IP re-registration, rather than leaving the matter to the 1xRTT (rel. 0) base station.

The embodiments that are presented herein are for use in the AT so that the AT may determine when certain handback scenarios have occurred, so that the AT may force the resynchronization of PPP sessions. In other words, the embodiments are for allowing the AT to determine when the 1xRTT network may be unable to detect that the AT had visited a different network, and if the network is confused, to allow the AT to force a resynchronization.

In one embodiment, hardware in an AT, such as at least one processing element communicatively coupled to at least one memory element, are configured to retain knowledge of a CANID value from a packet-ANID static network, such as (but not limited to) a 1xRTT rev. 0 network, and to perform a mapping of the CANID value to the serving PDSN/Foreign Agent. A packet-ANID static network is defined as one where the mapping of ANID to PDSN is constant throughout the duration of a mobile's PPP session. Alternatively, the embodiment may be implemented in software. Under certain conditions, the AT recognizes a change in CANID to lead to a condition where the network's concept of the AT's PPP state is inconsistent with the AT's concept. Whenever the AT deems the mapping to be inconsistent, the AT will force a resynchronization of the PPP session.

In one aspect of the embodiment, the mapping occurs using the PZID value of the (P/C)ANID. Note that the PZID, SID and the NID values do not necessarily determine which Foreign Agent is currently supporting the current PCF, since some CDMA 2000 networks, such as CDMA 1xEV-DO (rev. 0), may not be obligated to maintain this unique mapping between PCF and Foreign Agent. Hence, in the situation illustrated in FIG. 4, the AT would map $PCF_2$ on the 1xRTT network to Foreign Agent A. ($PCF_2 \Leftrightarrow FA_A$.) The AT would map $PCF_2$ on the 1xEV-DO network to Foreign Agent B. ($PCF_2 \Leftrightarrow FA_B$.) If inconsistency in the ANID-PDSN mapping is detected in the memory element, the MS may determine that this embodiment is not applicable and conservatively force a PPP resynchronization upon ANID change. This implementation ensures that the AT does not erroneously miss an inconsistency between the AT's actual PPP state and the PDSN's perception of the AT's PPP state.

Additionally, if the AT determines that the PANID value of the 1xEV-DO PDSN cannot be delivered to the 1xRTT network, the AT may be configured to deem the network to be confused and to force a PPP resynchronization.

In another aspect of the embodiment, the AT may be configured to use the "PPP Magic Number" to determine whether to force a resynchronization of the PPP session. The PPP Magic Numbers are identifiers for the parties of a PPP session, i.e. the PDSN and AT. Such identifiers are randomly generated and are used to identify loop backs and other Data Link Layer anomalies. A more detailed description of Magic Numbers is found in aforementioned RFC 1661.

Figure 7:
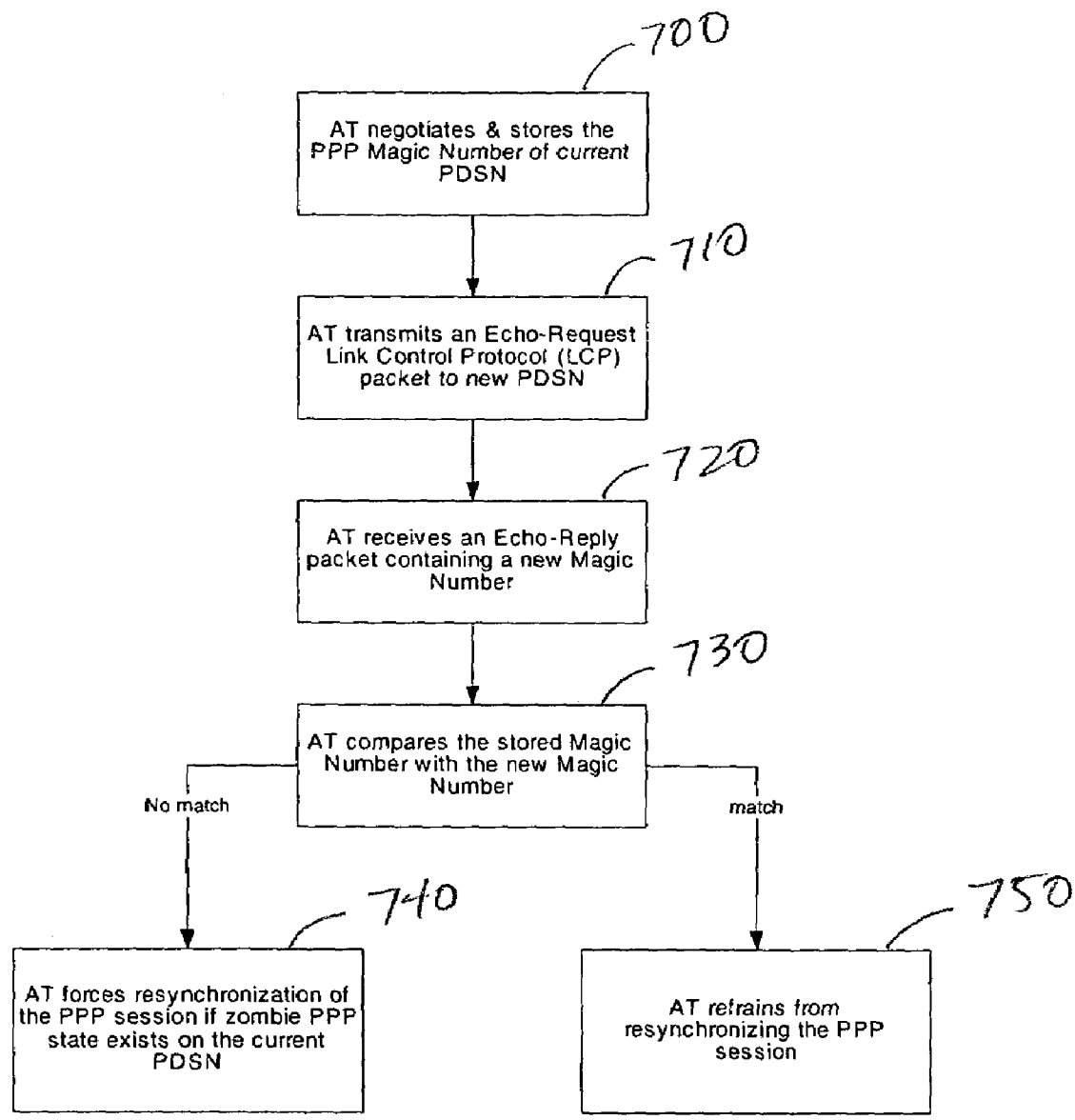
FIG. 7 is a flow chart illustrating the use of PPP Magic Numbers by the AT to force PPP resynchronization.

A method for using PPP Magic Numbers may be implemented in hardware using at least one processing element which executes instructions for the method, wherein said instructions are stored on at least one memory element. Alternatively, this method may be implemented in software. By this method, the AT constructs a database mapping the magic number to previously visited PDSNs. The AT determines at the Data Link Layer whether a recently received Magic Number matches one stored in memory. If the recently received Magic Number does not match the last visited, then the AT may determine that the current PPP session needs resynchronization. FIG. 7 is a flow chart illustrating this embodiment.

First, at step 700, the AT negotiates the PPP Magic Number of the PDSN and stores the number into memory. Upon handoff to a different base station at step 710, the AT transmits an Echo-Request Link Control Protocol (LCP) packet upon determination of a new coverage area. The new coverage area may be a new air-interface network or a new subnet/PZID area. Note that subnet areas are defined by the control of different PCFs (see FIG. 1). At step 720, the AT receives an Echo-Reply packet containing a newly received Magic Number. At step 730, the AT compares the stored Magic Number with the newly received Magic Number. If the Magic Numbers do not match, and the AT determines that zombie PPP state exists on the current PDSN, then at step 740, the AT initiates the resynchronization of the PPP session. If the Magic Numbers do match, then at step 750, the AT refrains from resynchronizing the PPP session since no resynchronization is required. This Magic Number method is not as efficient as the mapping method since the AT must bring up some traffic channels to negotiate the PPP Magic Numbers.

The embodiments described above have been described in the context of movement between cdma2000 1xRTT networks and cdma2000 1xEV-DO networks, but it should be understood that the embodiments may also be used in the context of movement between any network using PPP/Mobile IP and cdma2000 1xEV-DO networks. For example, the PPP Magic Number embodiment involves the use of data link layer information, which is an attribute of the PPP packets, not of the air-interfaces. Hence, the data link layer information is available for use by an AT that is moving from the coverage of a WCDMA system to a cdma2000 1xEV-DO system in order to force a PPP session resynchronization.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for resynchronizing a Point-to-Point Protocol (PPP) session, comprising:
    mapping by a mobile access terminal (AT) a first identifier of a first packet control function to a first foreign agent corresponding to a first PPP state of the AT in a first network;
    mapping by the AT a second identifier of a second packet control function to a second foreign agent corresponding to a second PPP state of the AT in a second network different from the first network;
    determining by the AT, upon moving back to the first network from the second network, that the two identifiers are the same; and
    forcing, by the AT, the first network to perform a PPP resynchronization based on the determining.

2. The method of claim 1, wherein the first network is a cdma2000 1xRTT network.

3. The method of claim 1, wherein the second network is a cdma2000 1xEV-DO network.

4. The method of claim 1, wherein the forcing is further based on a determination by the AT that the first network is confused if the AT is unable to deliver an identifier of the second network to the first network.

5. Apparatus for resynchronizing a Point-to-Point Protocol (PPP) session, comprising:
    at least one processing element; and
    at least one memory element communicatively coupled to the at least one processing element and configured to execute a set of instructions for:
        mapping a first identifier of a first packet control function to a first foreign agent corresponding to a first PPP state of the apparatus in a first network;

mapping a second identifier of a second packet control function to a second foreign agent corresponding to a second PPP state of the aPParatus in a second network;

determining, upon the apparatus moving back to the first network from the second network, that the two identifiers are the same; and forcing, by the apparatus, the first network to perform a PPP resynchronization.

6. A method for resynchronizing a Point-to-Point Protocol (PPP) session that has been initiated between a first network and an access terminal (AT), continued between a second network and the AT, and subsequently continued between the first network and the AT, the method comprising:

storing at the AT a PPP Magic Number associated with a PDSN of the first network;

transmitting, by the AT, an Echo-Request Link Control Protocol (LCP) packet upon determination by the AT that the AT is in a new coverage area;

receiving an Echo-Reply LCP packet;

comparing at the AT a PPP Magic Number in the Echo-Reply LCP packet to the stored PPP Magic Number;

determining at the AT that a zombie PPP state exists on the new coverage area if the stored PPP Magic Number and the PPP Magic Number in the Echo-Reply LCP packet do not match; and initializing, by the AT, a PPP resynchronization in the new coverage area based on the determination that the stored PPP Magic Number and the PPP Magic Number in the Echo-Reply LCP racket do not match.

7. Apparatus for resynchronizing a Point-to-Point Protocol (PPP) session that has been initiated between a first network and an access terminal (AT), continued between a second network and the AT, and subsequently continued between the first network and the AT, comprising:

at least one processing element; and at least one memory element communicatively coupled to the at least one processing element and configured to execute a set of instructions for:

storing at the AT a PPP Magic Number associated with a PDSN of the first network;

transmitting, by the AT, an Echo-Request Link Control Protocol (LCP) packet upon determination by the AT that the AT is in-a new coverage area;

receiving an Echo-Reply LCP packet;

comparing at the AT a PPP Magic Number in the Echo-Reply LCP packet to the stored PPP Magic Number;

determining at the AT that a zombie PPP states state exists on the new coverage area aRd if the stored PPP Magic Number and the PPP Magic Number in the Echo-Reply LCP packet do not match; and initializing, by the AT, a PPP resynchronization in the new coverage area based on the determination that the stored PPP Magic Number and the PPP Magic Number in the Echo-Reply LCP packet do not match.

8. The method of claim 1, wherein mapping of the first identifier further comprises storing a Previous Access Network ID (PANID), and wherein mapping of the second identifier further comprises storing a Current Access Network ID (CANID).

9. The method of claim 1, wherein mapping of the first identifier further comprises storing a first Packet Zone ID (PZID), and wherein mapping of the second identifier further comprises storing a second PZID.

10. The method of claim 1, wherein mapping of the first identifier further comprises storing a CANID value from a packet-ANH) static network.

11. The apparatus of claim 5, wherein the instructions for mapping of the first identifier further comprise instructions for storing a Previous Access Network ID (PANID), and wherein the instructions for mapping of the second identifier further comprise instructions for storing a Current Access Network ID (CANID).

12. The apparatus of claim 5, wherein the instructions for mapping of the first identifier further comprise instructions for storing a first Packet Zone ID (PZID), and wherein the instructions for mapping of the second identifier further comprise instructions for storing a second PZID.

13. The apparatus of claim 5, wherein the instructions for mapping of the first identifier further comprise instructions for storing a CANID value from a packet-ANID static network.

14. An apparatus for resynchronizing a Point-to-Point Protocol (PPP) session, comprising:

means for mapping by a mobile access terminal (AT) a first identifier of a first packet control function to a first foreign agent corresponding to a first PPP state of the AT in a first network;

means for mapping by the AT a second identifier of a second packet control function to a second foreign agent corresponding to a second PPP state of the AT in a second network different from the first network;

means for determining by the AT, upon moving back to the first network from the second network, that the two identifiers are the same; and means for forcing, by the AT, the first network to perform a PPP resynchronization based on the determining.

15. An apparatus for resynchronizing a Point-to-Point (PPP) session that has been initiated between a first network and an access terminal (AT), continued between a second network and the AT, and subsequently continued between the first network and the AT, the apparatus comprising:

means for storing at the AT a PPP Magic Number associated with a PDSN of the first network;

means for transmitting, by the AT, an Echo-Request Link Control Protocol (LCP) packet upon determination by the AT that the AT is in a new coverage area;

means for receiving an Echo-Reply LCP packet;

means for comparing at the AT a PPP Magic Number in the Echo-Reply LCP packet to the stored PPP Magic Number;

means for determining at the AT that a zombie PPP state exists on the new coverage area if the stored PPP Magic Number and the PPP Magic Number in the Echo-Reply LCP packet do not match; and means for initializing, by the AT, a PPP resynchronization in the new coverage area based on the determination that the stored PPP Magic Number and the PPP Magic Number in the Echo-Reply LCP packet do not match.

* * * * *

UNITED STATES PATENT AND TRADEMARK OFFICE
CERTIFICATE OF CORRECTION

PATENT NO. : 7,660,595 B2  Page 1 of 1
APPLICATION NO. : 11/182086
DATED : February 9, 2010
INVENTOR(S) : Ramaswamy et al.

It is certified that error appears in the above-identified patent and that said Letters Patent is hereby corrected as shown below:

Column 11, line 3, claim 5: "aPParatus" to read as --apparatus--

Column 11, line 30, claim 6: "racket" to read as --packet--

Column 11, line 44, claim 7: "in-a" to read as --in a--

Column 11, line 48, claim 7: "a zombie PPP states state" to read as --a zombie PPP state--

Column 11, line 49, claim 7: "area aRd if" to read as --area if--

Column 12, line 7, claim 10: "packet-ANH)" to read as --packet ANID--

Column 12, line 38, claim 15: "Point-to-Point (PPP)" to read as --Point-to-Point Protocol (PPP)--

Signed and Sealed this
Seventeenth Day of May, 2011

David J. Kappos
*Director of the United States Patent and Trademark Office*